United States Patent
Akimoto et al.

(10) Patent No.: US 6,541,104 B2
(45) Date of Patent: Apr. 1, 2003

(54) MAGNETIC RECORDING MEDIUM AND A MAGNETIC RECORDING DEVICE

(75) Inventors: Hideyuki Akimoto, Kawasaki (JP); Chiaki Okuyama, Higashine (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/801,955

(22) Filed: Mar. 8, 2001

(65) Prior Publication Data

US 2001/0009727 A1 Jul. 26, 2001

Related U.S. Application Data

(63) Continuation of application No. PCT/JP99/00747, filed on Feb. 19, 1999.

(30) Foreign Application Priority Data

Sep. 25, 1998 (JP) .............................. 10-272247

(51) Int. Cl.$^7$ .............................. G11B 5/66; G11B 5/70; G11B 5/012
(52) U.S. Cl. ........................ 428/212; 428/216; 428/336; 428/694 TS; 428/694 TC; 428/694 TM; 428/900; 360/97.01
(58) Field of Search .................... 428/694 TM, 694 TS, 428/694 TC, 212, 900, 213, 336, 216; 360/97.01

(56) References Cited

U.S. PATENT DOCUMENTS 5,922,456 A * 7/1999 Tanahashi et al. .......... 428/332
6,248,416 B1 * 6/2001 Lambeth et al. ........... 428/65.3

FOREIGN PATENT DOCUMENTS

| JP | 57-55531 | 4/1982 |
| JP | 63317922 A | * 12/1988 |
| JP | 5-314453 | 11/1993 |
| JP | 6-243456 | 9/1994 |
| JP | 06243456 A | * 9/1994 |
| JP | 7-169037 | 7/1995 |
| JP | 8-115516 | 5/1996 |
| JP | 63-317922 | 12/1998 |

* cited by examiner

Primary Examiner—Holly C. Rickman
(74) Attorney, Agent, or Firm—Greer, Burns & Crain, Ltd.

(57) ABSTRACT

A magnetic recording medium has a construction in which on a non-magnetic support member are successively stacked a seed layer made of a non-magnetic material that is mainly composed of Cr, a keeper layer made of an NiFe-type soft magnetic material, an intermediate layer made of a non-magnetic material that is mainly composed of Cr and a recording layer made of a magnetic material that is mainly composed of Co.

8 Claims, 5 Drawing Sheets

MAGNETIC RECORDING MEDIUM AND A MAGNETIC RECORDING DEVICE

This is a continuation of International Application No. PCT/JP99/00747 filed on Feb. 19, 1999, which was not published in English.

TECHNICAL FIELD

The present invention relates to a magnetic recording medium and a magnetic recording device that are suitable for high-density recording.

BACKGROUND ART

In recent years, along with the development of the information processing technique, there has been an increase in the kinds and amounts of information to be processed by computers, and for this reason, studies and developments have been extensively made so as to provide magnetic recording devices having a greater memory capacity, that is, magnetic recording devices capable of performing a high-density recording operation.

The studies and developments, which have been made to obtain magnetic recording devices capable of performing a high density recording operation, relate to both the magnetic head and the magnetic recording medium. For example, with respect to the magnetic head, a spin valve head, which is one type of a GMR head, has been developed as a magnetic head that is suitable for high-density recording and is capable of replacing conventional inductive heads. With respect to the magnetic recording medium, for example, a medium having the following construction has been proposed as a modified medium of a conventional magnetic recording medium having a construction in which a Cr base film, a Co alloy magnetic layer and a protective film are stacked on a non-magnetic support member.

As illustrated in FIG. 6, Japanese Patent Application Laid-Open (JP-A) No. 6-243456 has disclosed a magnetic recording medium having a construction in which an NiFe base layer 22, a Cr base layer 23, a CoCrTa magnetic layer 24 and a protective film 25 are stacked on an Al substrate 21. Moreover, as illustrated in FIG. 7, Japanese Patent Application Laid-Open (JP-A) No. 7-169037 has disclosed a magnetic recording medium having a construction in which a Cr base layer 32, a Co-based alloy magnetic layer 33, an NiFe layer 34 and a protective film 35 are stacked on an NiP—Al substrate 31.

In order to provide high-density recording, it is necessary to increase the S/N ratio of a magnetic recording medium, and for this purpose, it is necessary to miniaturize the size of grains constituting the recording layer. However, when the grain size is miniaturized, a problem arises, in which there is degradation in the thermal stability of recorded information (the recorded information tends to be lost).

Here, as illustrated in FIG. 6, in the case of a construction in which a soft magnetic material layer (NiFe base layer 22) is placed beneath a recording layer (CoCrTa magnetic layer 24), since a leakage magnetic flux from a transition area of the recording layer is short-circuited by the soft magnetic material layer (referred to as a keeper layer), there is a great reduction in the demagnetization field of the transition area, with the result that the thermal stability of recorded information can be improved. In other words, this construction makes it possible to compensate for the degradation in the thermal stability occurring due to the miniaturization of the grain size of the recording layer for achieving a high S/N ratio.

However, the application of this construction causes a reduction in the Hc of the recording layer, resulting in failure to provide a high S/N ratio.

It is an object of this invention to provide a recording magnetic medium which has a high Hc, and exhibits superior thermal stability.

DISCLOSURE OF THE INVENTION

The inventors of the present invention have studied hard so as to solve the above-mentioned problems and found that it is possible to provide a recording magnetic medium which has a high Hc, and exhibits superior thermal stability by placing a seed layer made of a non-magnetic material that is mainly composed of Cr between a so-called keeper layer and a non-magnetic support member.

In other words, the magnetic recording medium of the present invention is characterized by a construction in which on a non-magnetic support member are successively stacked a seed layer made of a non-magnetic material that is mainly composed of Cr, a keeper layer made of an NiFe-type soft magnetic material, an intermediate layer made of a non-magnetic material that is mainly composed of Cr and a recording layer made of a magnetic material that is mainly composed of Co.

Moreover, the magnetic recording medium of the present invention is characterized in that the non-magnetic material forming the seed layer includes at least one kind of or two or more kinds of elements selected from the group consisting of Mo, W, V, Nb, Ta, Ti, Zr and Zn.

Furthermore, the magnetic recording medium of the present invention is characterized in that the seed layer has a film thickness of not more than 50 nm.

The magnetic recording medium of the present invention is also characterized in that in the recording layer, a value obtained by multiplying the remanent magnetic flux density by the film thickness is set to not more than 120 G$\mu$m.

Moreover, the magnetic recording medium of the present invention is characterized in that the value obtained by multiplying the remanent magnetic flux density by the film thickness in the recording layer is greater than a ½ of a value obtained by multiplying the remanent magnetic flux density by the film thickness in the keeper layer, and is also smaller than 3 times the value.

Furthermore, the magnetic recording medium of the present invention is characterized in that the non-magnetic material forming the intermediate layer includes at least one kind of or two or more kinds of elements selected from the group consisting of Mo, W, V, Nb, Ta, Ti, Zr and Zn.

The magnetic recording medium of the present invention is characterized in that the intermediate layer has a film thickness of 5 to 100 nm.

Moreover, the magnetic recording medium of the present invention is characterized in that a carbon-type protective film is further formed on the recording layer.

Furthermore, the magnetic recording device of the present invention is characterized by including any one of the above-mentioned magnetic recording media and a head of a magneto resistance effect type.

BEST MODE FOR CARRYING OUT THE INVENTION

Preferred embodiments of the magnetic recording medium and a magnetic recording device in accordance with the present invention will be explained in detail below with reference to the drawings.

Figure 1:
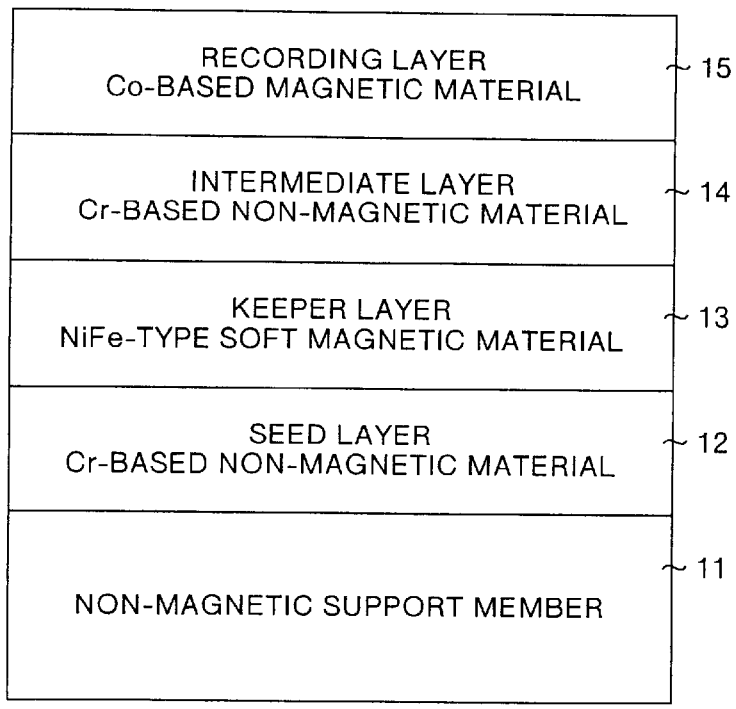
FIG. 1 is an explanatory drawing that shows a magnetic recording medium in accordance with one mode of the present invention.

As illustrated in FIG. 1, the magnetic recording medium of the present invention has a construction in which on a non-magnetic support member 11 are successively stacked a seed layer 12 made of a non-magnetic material that is mainly composed of Cr, a keeper layer 13 made of an NiFe-type soft magnetic material, an intermediate layer 14 made of a non-magnetic material that is mainly composed of Cr and a recording layer 15 made of a magnetic material that is mainly composed of Co.

With respect to the non-magnetic support member 11, for example, an Al substrate on which NiP is plated is used, and the respective layers are formed by using, for example, a sputtering method.

With respect to the Cr-based non-magnetic material for forming the seed layer 12, Cr as a single element, or a material, which is formed by adding to Cr one kind or two or more kinds of elements selected from the group consisting Mo, W, V, Nb, Ta, Ti, Zr and Zn, is used. In the same manner, with respect to the Cr-based non-magnetic material for forming the intermediate layer 14, Cr as a single element, or a material, which is formed by adding to Cr one kind or two or more kinds of elements selected from the group consisting Mo, W, V, Nb, Ta, Ti, Zr and Zn, is used.

Here, among the elements of the above-mentioned group, Mo, W, V, Nb and Ta have the same bcc structure as Cr, and these elements have a lattice spacing wider than that of Cr. For this reason, it is possible to easily widen the lattice spacing of the Cr-based non-magnetic material by allowing it to contain these elements. Therefore, in the case when the recording layer 15 is formed by using a Co-based magnetic material (for example, CoCrTa, etc. to which Pt is added) having a comparatively wider lattice spacing, it is preferable to form both of the seed layer 12 and the intermediate layer 14 or either one of these by using a Cr-based non-magnetic material containing one kind or two or more kinds of these elements.

In other words, amaterial to which Mo, etc., the amount of which is set so as to allow the (002) spacing of a Co-based magnetic material to be used is made coincident with its (110) spacing, is added is preferably used so as to form the seed layer 12 and the intermediate layer 14 so that the respective layers up to the recording layer 15 are allowed to hetero-epitaxially grow.

Moreover, since Ti, Zr and Zn are elements which, when added by an amount of several at %, can finely divide the organization, a Cr-based non-magnetic material containing these elements is used so as to form both of the seed layer 12 and the intermediate layer 14 or either one of these; thus, it becomes possible to finely divide the grain size that is the minimum unit of magnetic recording, and consequently to reduce the medium noise. Here, since Ti, Zr and Zn are elements having a hcp structure, they have a small solid solution limit with respect to Cr; however, by using a thin-film forming technique such as sputtering, several at % of these elements is forcefully formed into a solid solution in Cr.

The film thickness of the seed layer 12 may be set to any film thickness as long as the seed layer 12 is allowed to exist as a layer. However, when the film thickness is too great, the medium noise increases as a result of the increase of crystal grain size. For this reason, the film thickness of the seed layer 12 is preferably set to a thickness which does not allow the crystal grain size to grow so much, for example, not more than 50 nm.

With respect to the Co-based magnetic material for forming the recording layer 15, a material having a high Hc, for example, CoCr, CoCrTa and materials formed by adding Pt to these, may be used. Moreover, upon forming the recording layer 15, it is preferable to set the result of multiplication, "Brt-hard", between the remanent magnetic flux density Br and the film thickness t is set to not more than 120 G$\mu$m. This is because, since the magnetic recording medium of the present invention aims to provide high-density recording, it is utilized in combination with a head of a magnetoresistance effect type using magnetoresistance effect type elements (so-called MR elements and GMR elements) and when the leakage magnetic flux intensity from the recording layer is extremely great, the output of the head of a magnetoresistance effect type becomes saturated, resulting in an increase in the non-symmetric property of the output.

Therefore, it is preferable to form the recording layer 15 in such a manner that the result of multiplication, "Brt-hard", between the remanent magnetic flux density Br and the film thickness t, which is an index of the leakage magnetic flux intensity, is set to not more than 120 G$\mu$m. From the viewpoint that an excessive film thickness t results in degradation in the resolution, it is also preferable to set the "Brt-hard" to not more than 120 G$\mu$m.

Moreover, with respect to the thermal stability of medium recorded information made by the keeper layer 13, it is achieved by short-circuiting the leakage magnetic flux from the recording layer in a transition area by the use of the keeper layer 13 and thus greatly reducing the demagnetization field in the transition area. Here, in order to efficiently direct the leakage magnetic flux to the keeper layer 13, the result of multiplication, "Bst-keeper", between the saturated magnetic flux density Bs and the film thickness t of the keeper layer is preferably set to be greater than the above-mentioned Brt-hard; however, when this is increased excessively, the reproducing output is lowered. Moreover, when this is reduced extremely, the thermal stability of recorded information deteriorates. Therefore, it is preferable to form the keeper layer 13 in a manner so as to satisfy the following inequality: $0.5 \times \text{Bst-keeper} < \text{Brt-hard} < 3 \times \text{Bst-keeper}$.

In general, in the case of a film thickness of not more than 5 nm of the intermediate layer 14, it is not possible to obtain a Hc that is practically used, and in the case of not less than 100 nm, the medium noise increases because of the increase of the crystal grain size; therefore, the film thickness of the intermediate layer 14 is preferably set in the range of 5 to 100 nm. Moreover, upon manufacturing the magnetic recording medium of the present invention, it is preferable to further place a carbon-type protective film on the recording layer 15 in order to improve the durability against accidental contact between the CSS and the medium as well as the head and the medium.

Figure 2:
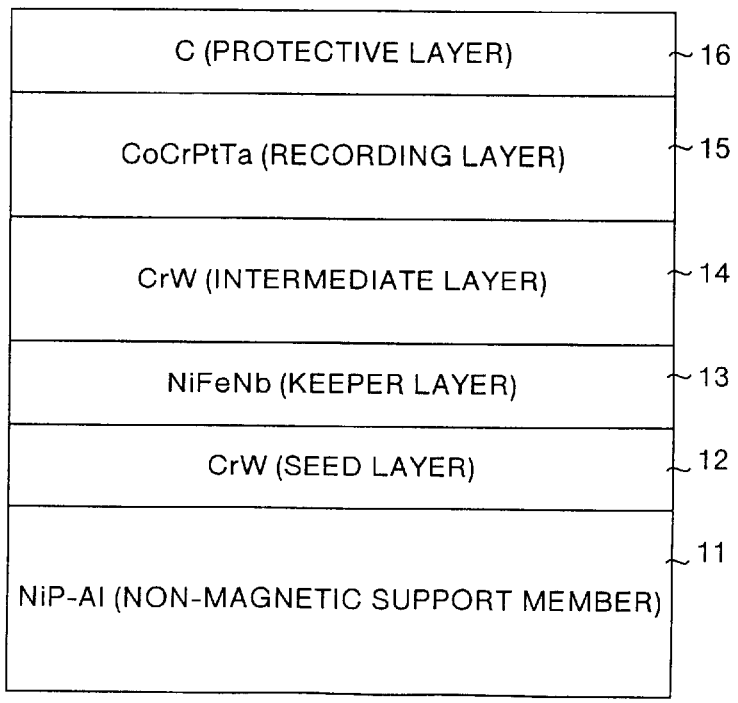
FIG. 2 is a drawing that shows a construction of a magnetic recording medium in accordance with one embodiment of the present invention.

Next, an explanation will be given of characteristics of the magnetic recording medium in accordance with the present invention. As illustrated in FIG. 2, evaluation of the characteristics is carried out on a magnetic recording medium having a construction in which on a non-magnetic support member 11 are stacked a seedlayer 12, a keeper layer 13, an intermediate layer 14, a recording layer 15 and a protective layer 16. More specifically, the magnetic recording medium, which is subjected to the evaluation of the characteristics, is provided with an NiP—Al disk substrate that has been texture-processed as the non-magnetic support member 11, and a $Cr_{90}W_{10}$ (numeric values: at %) film formed by a DC magnetron sputtering method as the seed layer 12. Moreover, an NiFeNb soft magnetic film, a $Cr_{90}W_{10}$ film, a $Co_{68}Cr_{20}Pt_{10}Ta_2$ film and a carbon film, respectively formed by using a DC magnetron sputtering method, are provided as the keeper layer 13, the intermediate layer 14, the recording layer 15 and the protective layer 16.

In the formation of each of the layers using the DC magnetron sputtering method, Ar was used as a sputtering gas, the gas pressure was set to 5 mTorr, the applied bias voltage was set to –200 V and the substrate temperature was set at 280° C. Thus, a number of magnetic recording media, each having the construction as shown in the figure and a different film thickness, were prepared. Moreover, another magnetic recording medium having not the $Cr_{90}W_{10}$ film, but a Cr film was also formed as the seed layer 12.

Figure 3:
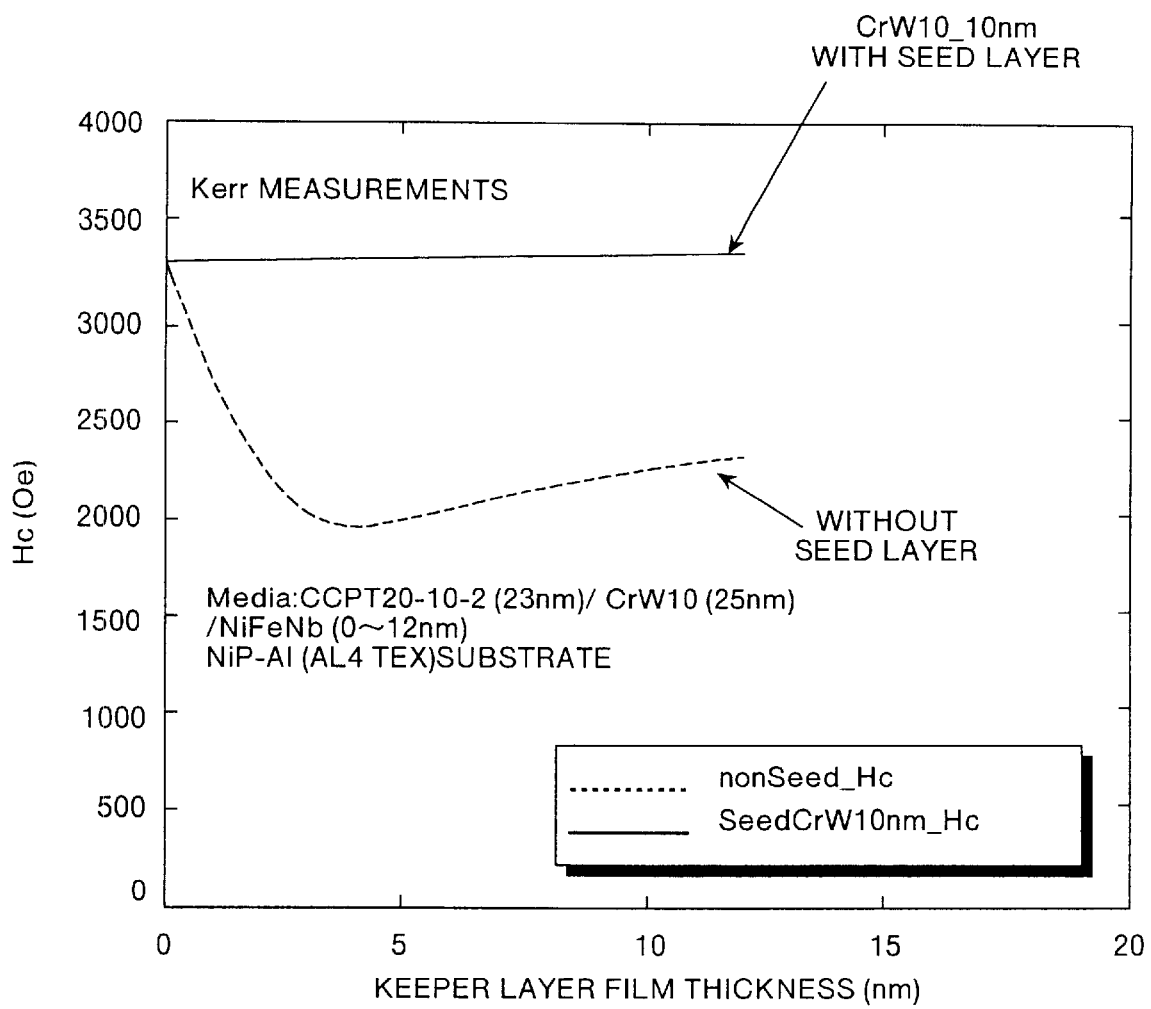
FIG. 3 is a graph that shows the keeper layer film-thickness dependence of the coercive force of a magnetic recording medium with a seed layer and that of a magnetic recording medium without the seed layer.

The following description will discuss the results of evaluation of the characteristics of the respective magnetic recording media thus manufactured. FIG. 3 is a graph that shows the keeper layer film-thickness dependence of the coercive force (Hc) of a magnetic recording medium with a seed layer and that of a magnetic recording medium without the seed layer. Here, in the figure, the results of measurements on the magnetic recording medium with the seed layer are given as a solid line.

More specifically, the results of Kerr measurements are shown with respect to magnetic recording media in which the film thicknesses of the $Cr_{90}W_{10}$ intermediate layer, the $Co_{68}Cr_{20}Pt_{10}Ta_2$ recording layer and the $Cr_{90}W_{10}$ seed layer were respectively fixed to 25, 23 and 10 nm while the film thickness of the NiFeNb keeper layer was varied in the range of 0 to 12. Here, the results of Kerr measurements on the magnetic recording medium having the same construction except for the lack of the seed layer are given as a dotted line.

As shown in the figure, in the medium (dotted line) without the seed layer, the existence of the keeper layer causes a reduction in the Hc. In contrast, the medium (solid line) with the CrW seed layer exhibits the same Hc (to 3200 Oe) as the case of the lack of the keeper layer even when the keeper layer is provided. In other words, the application of the seed layer makes it possible to increase the Hc.

Figure 4:
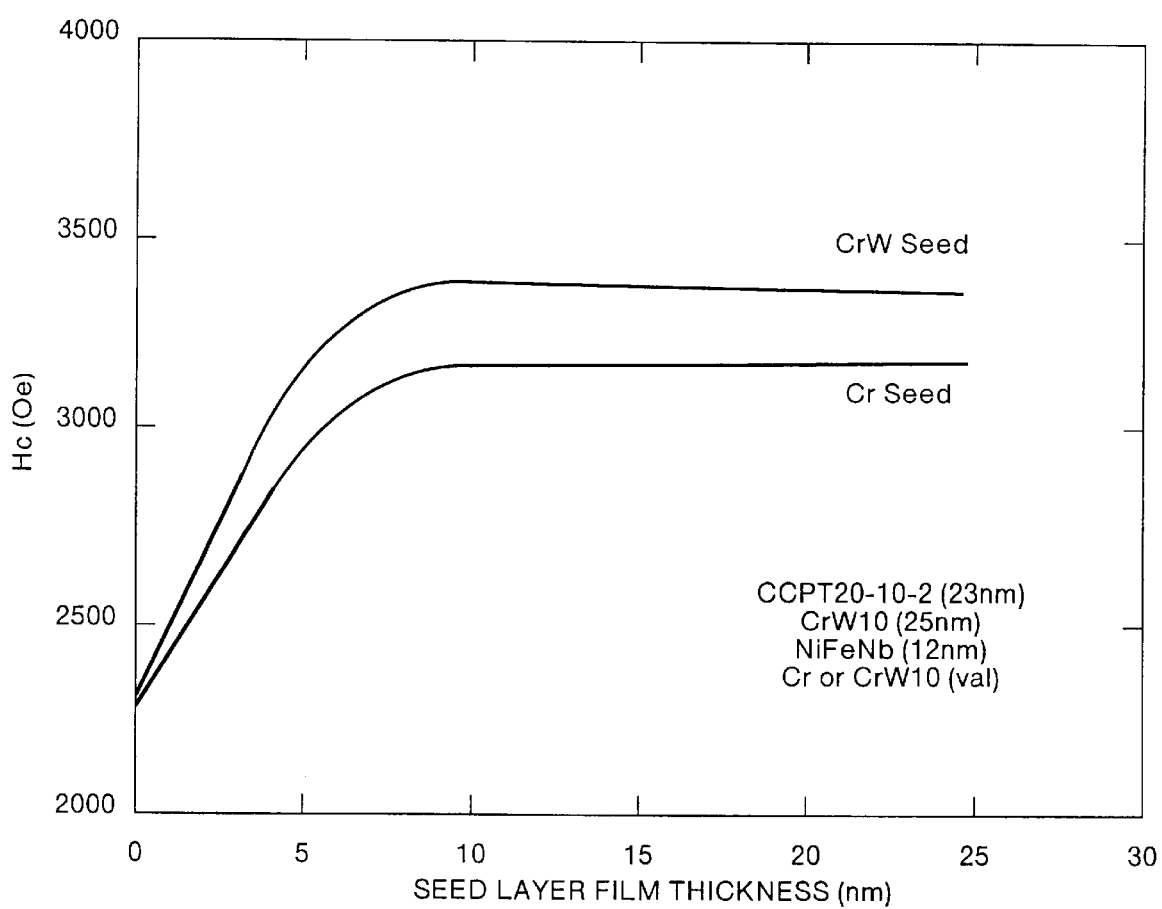
FIG. 4 is a graph that shows the seed layer film-thickness dependence of the coercive force of a magnetic recording medium with a keeper layer.

The Hc increasing effect of the seed layer is not dependent on its film thickness, and is available even in the case when the seed layer is not composed of $Cr_{90}W_{10}$. As one example of the experimental result supporting this fact, FIG. 4 shows the seed layer film-thickness dependence of the Hc in the case of the application of $Cr_{90}W_{10}$ as the seed layer material in comparison with the case of the application of Cr.

Here, in the figure, the results of Kerr measurements were obtained with respect to magnetic recording media in which the film thicknesses of the $Cr_{90}W_{10}$ intermediate layer, the $Co_{68}Cr_{20}Pt_{10}Ta_2$ recording layer and the NiFeNb keeper layer were respectively fixed to 25, 23 and 12 nm while the film thickness of the CrW seed layer or the Cr seed layer was varied, and among the results, those results of measurements obtained when the thickness of the Cr seed layer is located in the range of 1 to 25 nm are shown.

As clearly shown by the figure, independent of the thickness thereof, the seed layer made of any material makes it possible to provide a medium having a higher Hc as compared with the case without the seed layer (see Hc in the case of 0 nm of the seed layer film thickness). Here, in the case of the application of the seed layer made of $Cr_{90}W_{10}$, a medium having a higher Hc is obtained. This is because, since the recording layer is composed of $Co_{68}Cr_{20}Pt_{10}Ta_2$ that is a material having an extended c-axis length due to the addition of Pt, $Cr_{90}W_{10}$ has a better matching in the lattice constant with the recording layer material.

Figure 5:
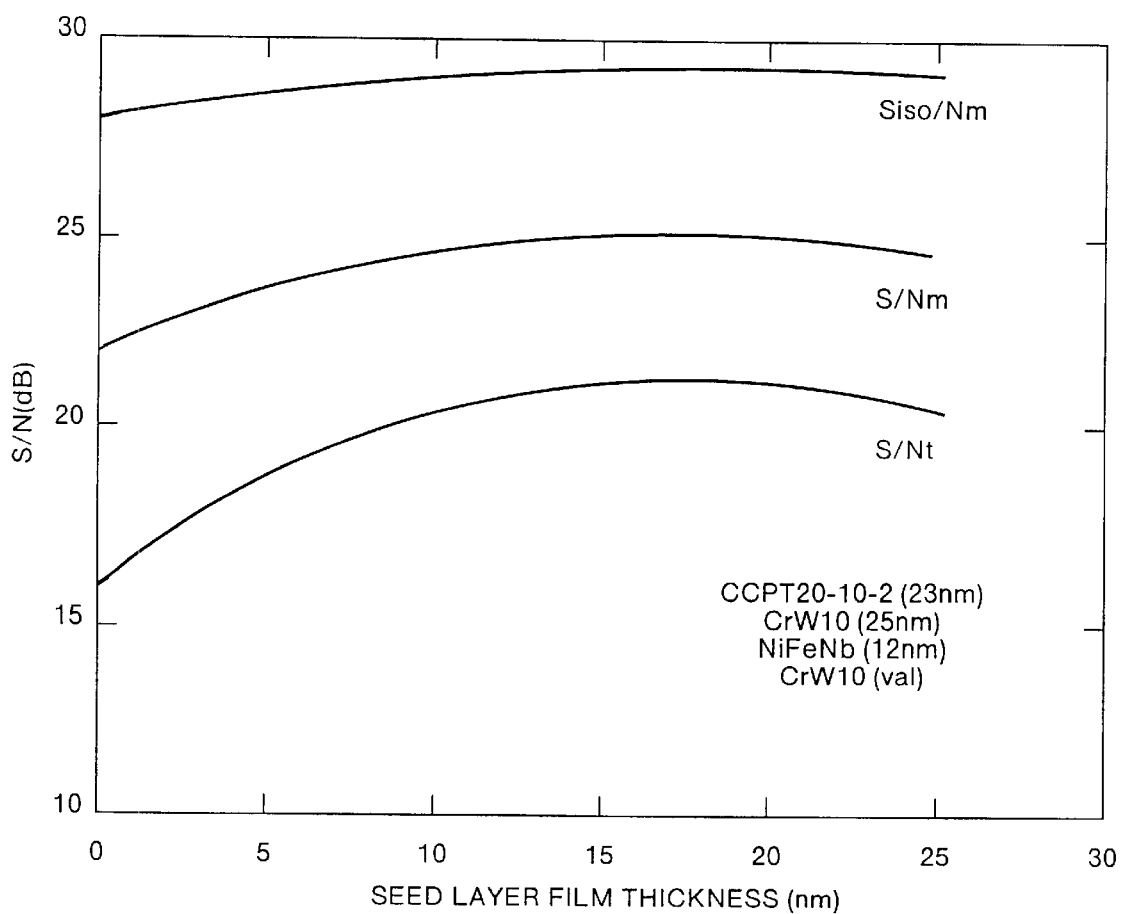
FIG. 5 is a graph that shows the seed layer film-thickness dependence of the S/N of the magnetic recording medium with the keeper layer.
Figure 6:
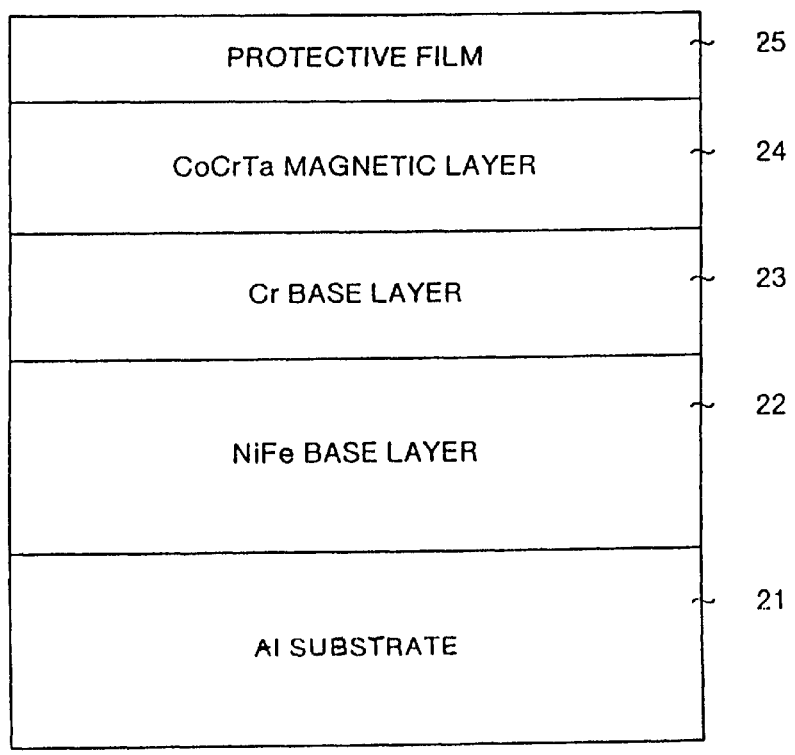
FIG. 6 is a drawing that shows a construction of a magnetic recording medium described in Japanese Patent Application Laid-Open (JP-A) No. 6-243456.
Figure 7:
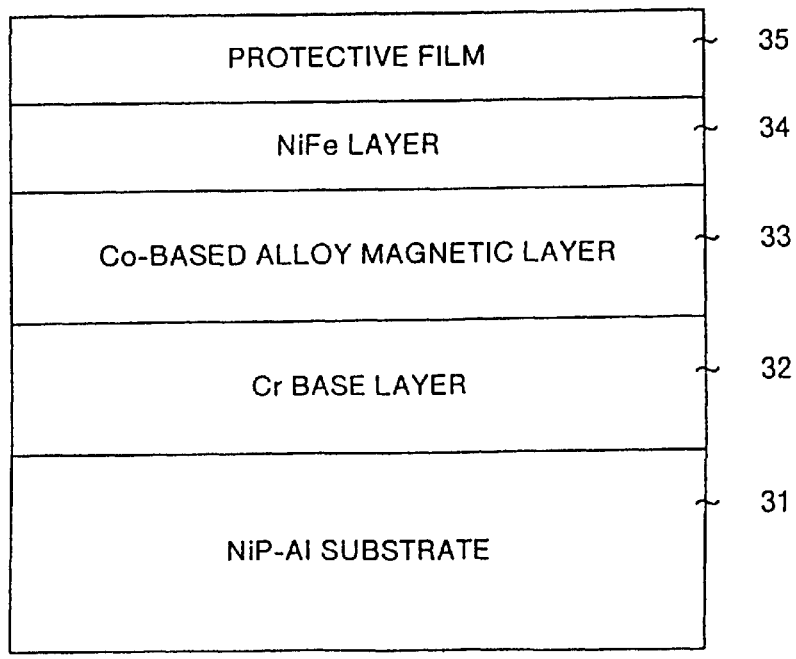
FIG. 7 is a drawing that shows a construction of a magnetic recording medium described in Japanese Patent Application Laid-Open (JP-A) No. 7-169037.

As described above, the magnetic recording medium of the present embodiment provided with the seed layer is allowed to form a keeper medium having a high Hc, thereby making it possible to exhibit a higher S/N as compared with normal keeper media. In fact, the magnetic recording medium using the CrW seed layer, which has Hc whose seed layer film-thickness dependence is shown in FIG. 4, has been confirmed to have a higher S/N than those keeper media without the seed layer, as shown in FIG. 5.

Here, in this figure, Siso/Nm is a isolated signal to Medium Noise (at 180 KFCI) ratio measured by combining each of the magnetic recording media in a magnetic recording device provided with a spin valve head, and S/Nm is a medium S/N in the case of a recording density of 180 kFCI. S/Nt is a total S/N in the case of the recording density of 180 kFCI, and the respective S/N ratios in the case of 0 nm of the seed layer film thickness represent S/N ratios of the normal keeper medium (without the seed layer).

Moreover, this figure also shows that when the seed layer film thickness exceeds approximately 18 nm, the S/N tends to decrease in response to an increase in the seed layer film thickness (although not shown in the figure, up to the seed layer film thickness of 50 nm, it is possible to obtain a medium having a higher S/N than the normal keeper medium).

This is because the crystal grain size of the seed layer grow, resulting in an increase in the noise. For this reason, it is preferable to set the seedlayer film thickness in the range of 1 to 50 nm, preferably, in the range of 10 to 25 nm, which provides a particularly high S/N.

As described above, the present invention makes it possible to achieve a magnetic recording medium suitable for high-density recording, and consequently to provide a magnetic memory device capable of carrying out a high-density recording process.

Industrial Applicability

As described above, the magnetic recording medium and the magnetic recording device of the present invention are suitable for use in a recording device that realizes high-density recording.

What is claimed is:

1. A magnetic recording medium comprising a non-magnetic support member on which, a seed layer made of a non-magnetic material that is mainly composed of Cr; a keeper layer made of an NiFe soft magnetic material; an intermediate layer made of a non-magnetic material that is mainly composed of Cr; and a recording layer made of a magnetic material that is mainly composed of Co, are stacked successively, and wherein the value obtained by multiplying the remanent magnetic flux density by the film thickness in the recording layer is greater than a ½ of a value obtained by multiplying the remanent magnetic flux density by the film thickness in the keeper layer, and is also smaller than 3 times the value.

2. The magnetic recording medium according to claim 1, wherein the non-magnetic material forming the seed layer comprises at least one of element selected from the group consisting of Mo, W, V, Nb, Ta, Ti, Zr and Zn.

3. The magnetic recording medium according to claim 1, wherein the seed layer has a film thickness of not more than 50 nm.

4. The magnetic recording medium according to claim 1, wherein in the recording layer, a value obtained by multiplying the remanent magnetic flux density by the film thickness is set to not more than 120 G$\mu$m.

5. The magnetic recording medium according to claim 1, wherein the non-magnetic material forming the intermediate layer comprises at least one element selected from the group consisting of Mo, W, V, Nb, Ta, Ti, Zr and Zn.

6. The magnetic recording medium according to claim 1, wherein the intermediate layer has a film thickness of 5 to 100 nm.

7. The magnetic recording medium according to claim 1, wherein a carbon protective film is further formed on the recording layer.

8. A magnetic recording device comprising:

a magnetic recording media and a head of a magnetoresistance effect head, wherein the magnetic recording medium includes a non-magnetic support member on which, a seed layer made of a non-magnetic material that is mainly composed of Cr; a keeper layer made of an NiFe-type soft magnetic material; an intermediate layer made of a non-magnetic material that is mainly composed of Cr; and a recording layer made of a magnetic material that is mainly composed of Co, are stacked successively, and wherein the value obtained by multiplying the remanent magnetic flux density by the film thickness in the recording layer is greater than a ½ of a value obtained by multiplying the remanent magnetic flux density by the film thickness in the keeper layer, and is also smaller than 3 times the value.

* * * * *